3,134,022
SIGNAL DETECTOR FOR USE WITH
RADIATION SENSOR
Sydney Jones and Leonard Manns, Malvern, England, assignors to Minister of Supply, in Her Majesty's Government of the United Kingdom of Great Britain and Northern Ireland, London, England
Filed Nov. 26, 1952, Ser. No. 322,774
Claims priority, application Great Britain Nov. 30, 1951
6 Claims. (Cl. 250—214)

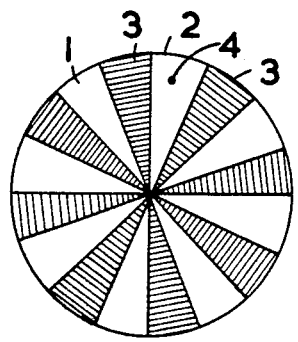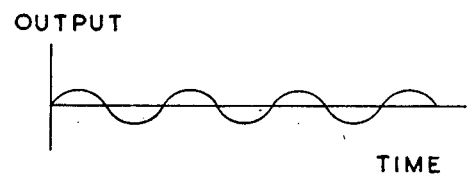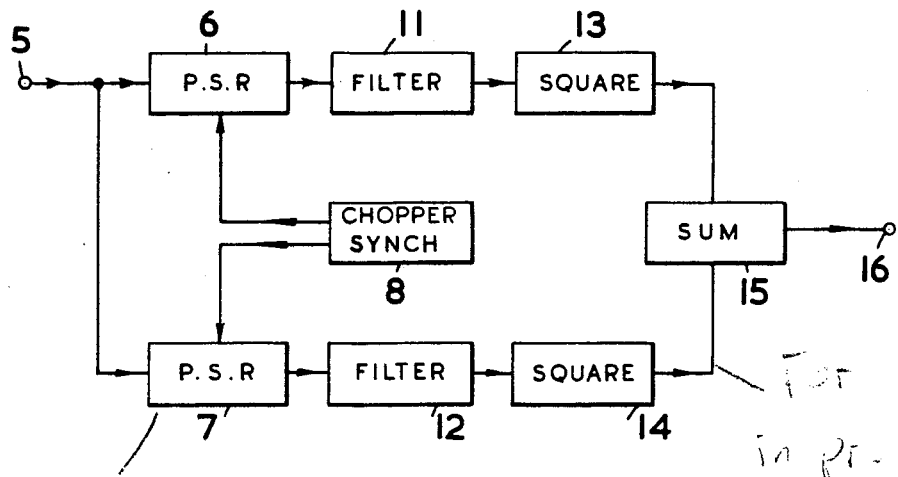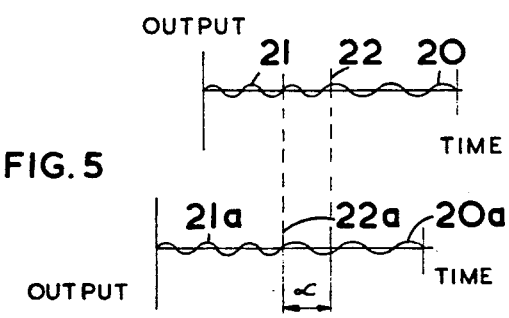

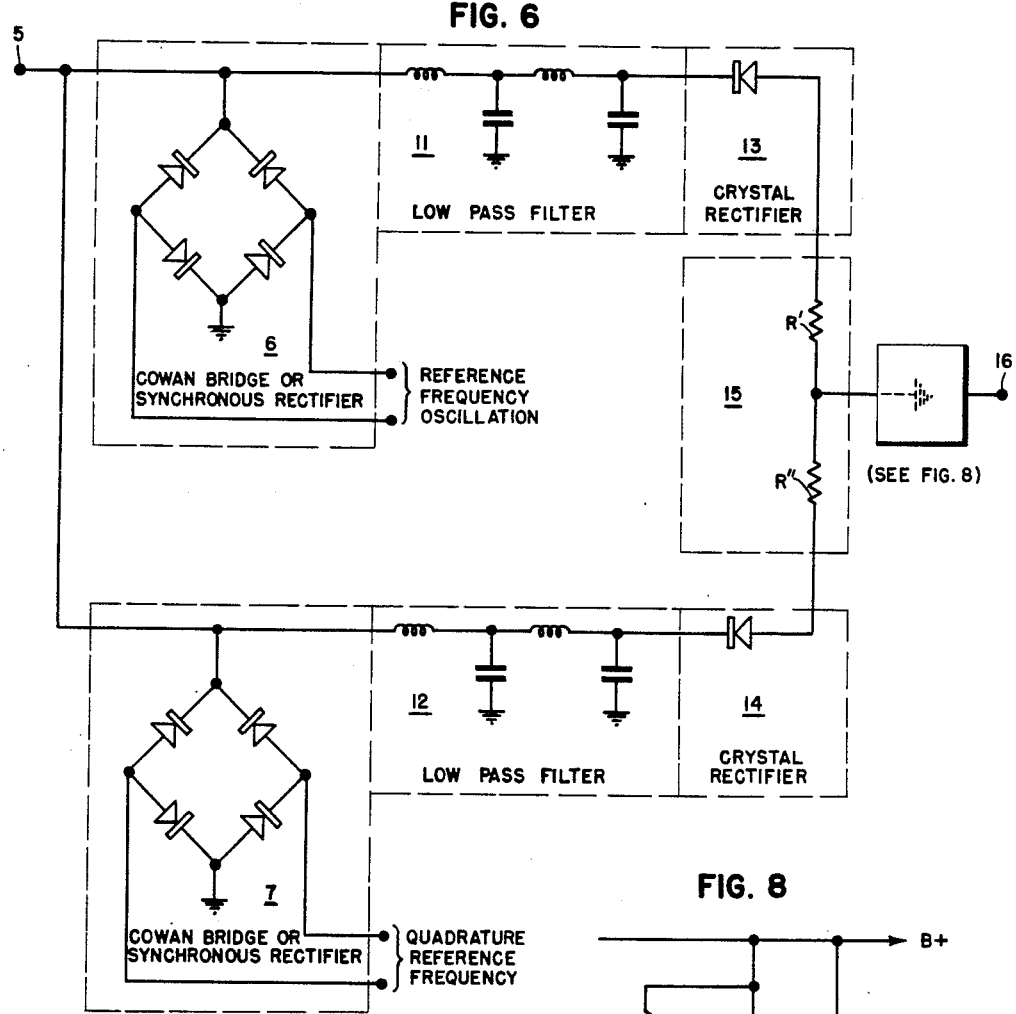
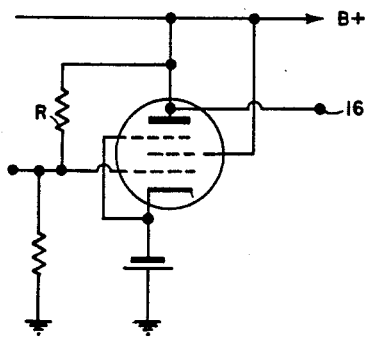
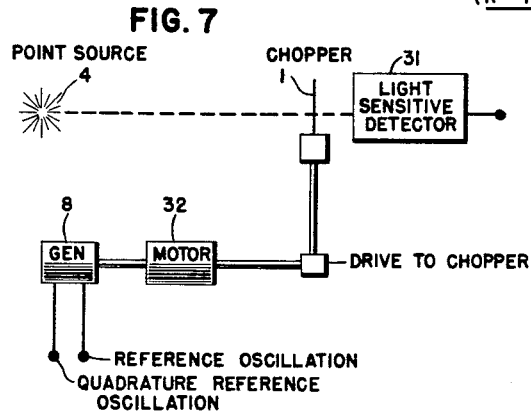

This invention relates to the detection of electric signals and has particular reference to the problem involved when a signal is heavily contaminated with noise, so that special precautions must be taken to discriminate against the noisy background in favour of the wanted signal.

A particular example of the circumstances to which the invention has application is found in the reception of light radiation from a given star against a relatively high background radiation intensity.

It is well known how to view the star by a suitable photo-sensitive detector device, giving an electrical output, through the chopper. The chopping action which may comprise the alternate viewing and obscuring of the field of view in alternate sectors does not affect the background radiation; the chopping action affects the star radiation and an alternating signal is produced because the star radiation coming from a small or point source, is interrupted or chopped by the chopper. The resulting electrical signal output of the photo-sensitive detector device then has two components, one is an alternating signal representing the star radiation and the other is a high mean level representing the background radiation.

Several types of chopper are in use, for example, the simple alternate opaque-transparent type or, the so-called two-colour type described in my co-pending British patent application No. 18635/51 (U.S. Serial No. 302,105 filed August 1, 1952).

The detection of such electrical signals involves the separation of the alternating signal from the rest of the photo-sensitive detector output and it will be appreciated that this involves the detection of the alternating signal in the presence of a large amount of noise.

It is well known that the phase sensitive rectifier has certain advantages in the detection of such signals owing to its property of being able to select one component of frequency (the desired signal in the present example) in the presence of others (the noise in the present example). The phase-sensitive rectifier can easily be made to select the one component without including as well a wide band of other frequencies and can be arranged, in many applications, so that it follows and allows for any frequency drift of the desired component.

A phase sensitive rectifier however, as its name implies, gives an output proportional to the phase, as well as to the amplitude, of the alternating input signal and so, where a D.C. value is required which indicates only the peak, or R.M.S., value of the alternating input signal and the phase of the input signal is not known, or is subject to random variations, the phase sensitive rectifier simpliciter is not adequate owing to possible variations in the output level of the rectifier.

In the particular example referred to above, a change of phase of the alternating signal part of the output would result from any angular movement of the star in the field of view of the chopper. It is desirable therefore to be able to separate the amplitude measuring function of the phase sensitive rectifier from the phase measuring function or at least to reduce the output variation due to phase change of the alternating signal.

It is accordingly an object of the invention to provide an improved signal detecting circuit capable of separate measurement of amplitude.

According to the invention there is provided a signal detecting means comprising a first phase sensitive rectifier adapted to be connected to an alternating signal source and to be fed with a first reference oscillation source, a second phase sensitive rectifier adapted to be connected also to said alternating signal source and to be fed with a second reference oscillation source in phase quadrature with the first reference oscillation, and a summation circuit adapted to sum the moduli of the rectified outputs of the first and second rectifiers.

According to the invention in another aspect there is provided a signal detecting means comprising a first phase sensitive rectifier adapted to be connected to an alternating signal source and to be fed with a first reference oscillation source, a second phase sensitive rectifier adapted to be connected also to said alternating signal source and to be fed with a second reference oscillation source in phase quadrature with the first reference oscillation, a first squaring circuit adapted to accept the rectified output from said first rectifier and to product a first squared output representing the square of the rectified output, a second squaring circuit adapted to accept the rectified output from said second rectifier and to produce a second squared output representing the square thereof, and a summation circuit adapted to sum said first and second squared outputs.

The term squaring refers of course to the mathematical function of raising a value to the power of two.

Because the reference oscillations of the first and second rectifiers are in quadrature, the output of the first is proportional to, say the cosine of the phase angle of the alternating signal relative to the phase angle of the first reference oscillation, and the output of the second is proportional to the cosine of the phase angle of the first reference oscillation plus, or minus, 90°. The output of the second is therefore proportional to the sine of the phase angle of the alternating signal relative to the phase angle of the first reference oscillation. It is easily seen from elementary trigonometry that if only a reduction of the phase sensitivity of the output is required the summing directly of the outputs of the phase sensitive rectifiers gives a signal which does not vary more than 30% of the value of the signal output of the arrangement using squaring circuits; the squaring of each of these rectifier outputs and the summing of the resultant squared signals results in the phase angle being more accurately eliminated to give an output independent of the phase of the original alternating signal.

Conveniently in application to the particular example discussed above the photosensitive detector serves as the source of alternating signal and the reference oscillation is obtained by appropriate circuits from the rotating chopper by which its frequency and phase are therefore determined.

There is also a requirement to be able to determine the timings of the frequency changeover points in the case of a signal which consists of known discrete periods of different frequency oscillations.

Such a requirement may arise in the detection of light from a star using a chopping method in which the chopper comprises a disc divided into two halves, one half having say five sectors and the other half having say nine sectors. Owing to this division each rotation of the chopper disc, when a point source is in the field of view, results in an alternating signal, corresponding to the point source, in which for one half of the rotational period, five undulations will occur and for the other half of the rotational period nine undulations will occur. It will be appreciated that, the angular position of the radius on which the point source lies in the chopper field of view relative to a given datum radius in the chopper field, determines the changeover point of the alternating signal frequency from one frequency corresponding to one half of the chopper disc (e.g. 5 sector half) to the other frequency corresponding to the other half of the chopper disc (e.g. 9 sector half). The times of occurrence of this changeover point indicate, therefore, the angular position of the point source in the chopper field.

It is therefore a further object of the invention to provide an improved signal detecting circuit as described above in which an indication is also given of the relative timing of the frequency changeover points of a signal consisting of discrete periods of oscillations of different frequency.

According to a feature of the invention therefore said signal detecting means includes a master source of reference oscillation in which a reference changeover oscillation is produced of different frequency in successive discrete periods having the same frequencies and lengths of its periods as an incoming signal from the alternating signal source and which possesses a first output and a second output, arranged to provide the said first and second reference oscillation sources respectively, which are in quadrature relation.

The output from the summation circuit, is then not only proportional to the square of the alternating input signal but, contains a factor which is proportional to the time difference between the frequency changeover points of the alternating input signal and those of the reference oscillation in one of its quadrature phases.

According to the invention in one aspect there is provided a method of detecting an alternating signal comprising the steps of, rectifying the alternating signal to produce an output proportional to the cosine of the phase angle between the alternating signal and a given reference oscillation, rectifying the alternating signal to produce an output proportional to the sine of the phase angle between the alternating signal and said reference oscillation, filtering the product of each of the rectifying steps to remove alternating components in these products, squaring the filtered products and adding the resultant squared signals.

In order that the invention may be made clear and may be more easily understood two embodiments of the invention will now be described reference being made to the accompanying drawings in which:

FIG. 1 shows the arrangement of a typical chopper,

FIG. 2 shows the idealised alternating signal output from a chopper of the type shown in FIG. 1, FIG. 3 shows a block diagram of a circuit arrangement as used in the invention, FIG. 4 shows a more advanced form of chopper, FIG. 5 shows a graph of waveforms concerned in one use of the chopper of FIG. 4 in the invention, FIG. 6 is a detailed view of the elements making up the blocks of FIG. 3, FIG. 7 shows the arrangement of the chopper and radiation detector, and FIG. 8 shows the detail of the summation circuit.

A chopper disc 1 of conventional pattern, having transparent sectors 2 and opaque sectors 3 alternately, is used to view a star against a uniformly radiating field. The star is shown diagrammatically in the field of the chopper as a point source 4. When the chopper disc 1 is rotated as by a motor 32 the radiation from the uniform field received by a photo-sensitive detecting means 31 through the disc 1 will be constant because a constant area of the disc 1 is transparent at any time. The point source 4, however, will be apparent to the photo-sensitive detecting means only when a transparent sector 2 of the chopper disc 1 is between it and the detecting means. Thus the output of the detecting means will comprise a signal made up of a component of constant mean value corresponding to the background intensity and an alternating value component corresponding to the chopped point source radiation.

The fundamental frequency of the alternating component is determined by the speed of rotation of the chopper disc 1 and the number of sectors 2 and 3 into which it is divided. In FIG. 2 a typical alternating signal derived from the output of the photo-sensitive detecting means is shown. It will be seen that the phase of the output curve of FIG. 2 corresponds to the condition where the point source 4 just appears at zero time when an opaque sector 3 ceases to obscure it during rotation of the chopper disc 1. Further it will be apparent that the relative angular positions of the point source 4 and the chopper disc 1 at any chosen datum time will determine the phase of the output curve of FIG. 2. Moreover, any angular movement of the point source will affect the phase of the output accordingly.

When, as is generally the case, a great deal of noise is present in the output of the detecting means in addition to the constant and alternating components it is desirable to use a phase sensitive rectifier to provide a rectified output corresponding to a given signal from a point source 4. The reference frequency oscillation for the phase sensitive rectifier can be obtained very conveniently from the chopper disc 1 either by mechanical, or electrical means, or a combination of both. The change of phase which results from a change of angular position of the point source 4 in the field of view of the chopper disc 1, however, prevents this use of a phase sensitive rectifier because of its inherent quality of phase sensitivity.

It will be seen how this difficulty is overcome now the arrangement of FIG. 3 is to be described.

The output from a photosensitive means 31 arranged as described above to view the point source 4 through the chopper disc 1, is connected to a terminal 5 of the arrangement of FIG. 3. The terminal 5 feeds to two phase sensitive rectifiers 6 and 7. A chopper-synchronised circuit 8 wherein a motor 32 drives both the chopper 1 and the synchroniser 8 provides a first reference oscillation, of frequency determined by the speed of rotation of the sectors of the chopper disc 1, for rectifier 6 and a quadrature reference oscillation of the same frequency but in quadrature with it for rectifier 7.

The output from rectifier 6 is consequently proportional to the value of the input signal on terminal 5 and also proportional to the cosine of its phase angle relative to the first reference oscillation from the circuit 8.

The output from rectifier 7 is similarly proportional to the value of the input signal on terminal 5 and also proportional to the cosine of its phase angle relative to the quadrature reference oscillation from the circuit 8. Hence, the output from rectifier 7 is proportional to the sine of the phase angle of the input signal on terminal 5 relative to the first reference oscillation from the circuit 8.

The outputs from the rectifiers 6 and 7 are respectively connected through filters 11 and 12 to squaring circuits 13 and 14 which may be any well known circuit operating on the square law principle, one type of which is illustrated in FIG. 6 as a crystal detector. After squaring in the circuits 13 and 14 the signals are summated in the sum circuit 15 a detailed embodiment of which is shown in FIG. 8.

It will now be apparent that because of the trigonometrical relation $\sin^2\phi + \cos^2\phi = 1$ the squared and summated outputs on terminal 16 from the sum circuit 15 will, apart from a constant of proportionality, equal the square of the input signal at terminal 5.

The filters 11 and 12 are arranged to be low pass filters cutting off at a very low frequency and so the noise content of the output at terminal 16 is much reduced in addition to the elimination of phase sensitivity by the means just described.

In addition to the use just described in chopper arrangements for detecting signals in the presence of noise and irrespective of phase shift, the detecting means of FIG. 3 may be used as a wave analyser of a signal applied to the terminal 5. The action of the circuit as a wave analyser is as follows:

If the first reference and quadrature reference oscillation inputs to the rectifiers 6 and 7 are arranged so that they can together be varied in frequency and the filters 11 and 12 are arranged to eliminate any alternating components in the output of the rectifiers 6 and 7, the presence of an output at terminal 16 will indicate that the first reference oscillation frequency and the frequency of a part of the input on terminal 5 are equal. This may be simply arranged by replacing the chopper-synchronised circuit 8 by a suitable, calibrated, variable frequency oscillator circuit and by designing the filters 11 and 12 appropriately.

In use with another particular chopper arrangement the detecting means of FIG. 3 has even greater advantages than in use with the chopper disc of type shown in FIG. 1.

FIG. 4 shows a more advanced type of chopper disc 17 in one-half of which there are 5 sectors 19 and in the other half of which there are 9 sectors 18. When a point source 4 is viewed through a rotating chopper disc of this kind the general result is as described in the previous embodiment in that a signal is obtained from the photosensitive means in which a constant component is due to background and an alternating component is due to the chopping of the point source. There is the difference, however, that for periods corresponding to alternate half revolutions of the disc 17 the fundamental frequency of the alternating component will be determined for a given speed of revolution according to the number of sectors in each half of the disc 17; in one case the number is five, in the other case nine. This is shown in one curve of FIG. 5 where one-half 20 (five sectors) and the other half (nine sectors) 21 have a frequency changeover point at 22. The times of frequency changeovers 22, or as it might be termed, their phase, are determined by the angular position of the point source 4 in the field of view of the chopper 17 and if, therefore the instants of frequency changeover 22 can be determined relative to a convenient time scale, the angular position of the point source 4 in the field of view of the chopper 17 and if, therefore, the instants of frequency changeover 22 can be determined relative to a convenient time scale, the angular position of the point source 4 in the field of view can be determined and made use of.

To this end the chopper-synchronised circuit 8 of FIG. 3 is driven from the chopper disc 17 by appropriate means as by motor 32 and the output of the detecting means 31 which observes the source 4 through the chopper disc 17, is connected to the terminal 5.

In operation, the action of the circuit of FIG. 3 is similar to that described above for the chopper 1 and is identical as long as the point source 4 is placed so that the frequency changeover points of the first reference and quadrature reference oscillations as determined by the disc 17 are in phase with the frequency changeover point of the input signal to the terminal 5; the first reference and quadrature reference oscillations then change their frequency with the input signal and signal, first reference and quadrature reference frequencies in any period are always equal. Angular movement of the point source 4 alters the frequency changeover point of the input signal but the frequency changeover point of the first reference and quadrature reference oscillations remains unchanged in time because they are derived from the chopper disc 17 which has not been changed. The results of this are shown in FIG. 5 where two curves are shown in a displaced condition. The changeover point of curves 21a and 20a is indicated at 22a. Curves 21a and 20a are taken to represent the first reference and quadrature reference oscillation for one revolution of the chopper disc 17 and curves 21 and 20 represent the input signal (the output from the detecting means) to the terminal 5. A displacement $\alpha$ is shown between the changeover points 22 and 22a.

Thus, effectively, for part of the time of each revolution of the chopper disc 17 there is a continually varying phase change between the first and quadrature reference, and signal oscillations. Although the output at the terminal 16 (FIG. 3) is again proportional to the square of the value of the input signal to terminal 5 the output now also varies according to the displacement $\alpha$ i.e. the period of time for which the first and quadrature reference, and the signal oscillations have no constant phase relationship between them. From the output on terminal 16 therefore it is possible to determine the displacement $\alpha$ and hence the relative position in the field of view of the point source 4. Methods of doing this will be known to those skilled in the art and will generally take the form of phase adjustments of the chopper disc 17. Such adjustments are conveniently made by rotation of the chopper disc and its driving means about the centre of the chopper disc 17 until the variation in the output on terminal 16 due to the displacement $\alpha$ disappears.

In an alternative embodiment of the invention which has advantage where a lesser degree of accuracy is acceptable an arrangement based on the expression $/\sin \phi/ + /\cos \phi/ \simeq$ is used. The circuits 13 and 14 do not function as squaring circuits but are made to pass the modulus of the amplitudes of the signals from filters 11 and 12 respectively to the circuit 15; circuit 15 is arranged to sum the outputs of circuits 13 and 14. The resultant signal is then within 30% of the value obtained from the arrangement of the previous embodiment. When used in a closed servo loop this inaccuracy will not affect the control exercised and the arrangement has the advantage that squaring circuits which are relatively difficult to construct are not required.

We claim:

1. A signal detector comprising a signal input, a first phase sensitive rectifier connected to the signal input, a first source of reference oscillations connected to the first rectifier, a second phase sensitive rectifier also connected to the signal input, a second source of reference oscillations connected to the second rectifier, and summation means connected to the outputs of the first and second phase rectifiers.

2. A signal detector as in claim 1 wherein said second reference oscillations are in quadrature with the phase of said first reference oscillations.

3. A signal detector as in claim 2 including a first square law means interposed between the first phase sensitive rectifier and the summation means, and a second square law means interposed between the second phase sensitive rectifier and the summation means, whereby the outputs of the rectifiers are each squared before summation.

4. A signal detector comprising a radiation sensitive means, a chopper means to chop the radiation reaching the sensitive means, and means associated with said chopper to produce two oscillations at the chopping frequency, the first oscillation being in phase quadrature with the second.

5. A signal detector comprising a signal input, a first phase sensitive rectifier connected to the input, a first filter network, a first square law circuit, a second phase sensitive rectifier also connected to the input, a second filter network, a second square law circuit, a summation means for combining the outputs of the square law circuits, a source of reference oscillations in phase quadrature, means for introducing the first reference oscillation into the first phase sensitive rectifier, and means for introducing the second reference oscillation into the second phase sensitive rectifier.

6. A signal detector as in claim 5 including a radiation sensitive means connected to the signal input, chopping means to chop the radiation reaching the sensitive means, said chopping means comprising alternate transparent and opaque sectors, and means for driving the chopping means and the source of reference oscillations at the same frequency.

References Cited in the file of this patent
UNITED STATES PATENTS

| | | |
|---|---|---|
| 2,227,007 | Schlesinger | Dec. 31, 1940 |
| 2,559,173 | Shawhan | July 3, 1951 |
| 2,587,555 | Weiss | Feb. 26, 1952 |